(12) United States Patent
Revach et al.

(10) Patent No.: US 10,503,766 B2
(45) Date of Patent: Dec. 10, 2019

(54) RETAIN DATA ABOVE THRESHOLD

(71) Applicant: HEWLETT PACKARD ENTERPRISE DEVELOPMENT LP, Houston, TX (US)

(72) Inventors: Eli Revach, Yehud (IL); Michael Aaron, Yehud (IL); Amos Nesher, Yehud (IL); Shahar Tal, Yehud (IL)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 192 days.

(21) Appl. No.: 15/500,037

(22) PCT Filed: Sep. 29, 2014

(86) PCT No.: PCT/US2014/057970
§ 371 (c)(1),
(2) Date: Jan. 28, 2017

(87) PCT Pub. No.: WO2016/053231
PCT Pub. Date: Apr. 7, 2016

(65) Prior Publication Data
US 2017/0242916 A1  Aug. 24, 2017

(51) Int. Cl.
*G06F 16/33* (2019.01)
*G06F 16/22* (2019.01)
(Continued)

(52) U.S. Cl.
CPC .......... *G06F 16/3331* (2019.01); *G06F 16/22* (2019.01); *G06F 16/35* (2019.01);
(Continued)

(58) Field of Classification Search
CPC .... G06F 3/0649; G06F 16/125; G06F 16/122; G06F 16/185; G06F 16/113;
(Continued)

(56) References Cited

U.S. PATENT DOCUMENTS 6,163,773 A    12/2000  Kishi
8,272,026 B1 *  9/2012  Sankruthi ............... G06F 21/62
                                                    726/1
(Continued)

FOREIGN PATENT DOCUMENTS

EP    2454684 A1    5/2012
JP    2014123281 A  7/2014
WO    2011/008198 A1  1/2011

OTHER PUBLICATIONS

International Searching Authority, "Notification of Transmittal of the International Search Report and the Written Opinion", PCT/US2014/057970, dated May 28, 2015, 12 pages.
(Continued)

*Primary Examiner* — David T. Brooks
(74) *Attorney, Agent, or Firm* — Hewlett Packard Enterprise Patent Department

(57) ABSTRACT

According to an example, different types of data stored at a database may be identified. The identified data may be scored, where different types of data are scored according to different schemes. The scored data that is above a threshold may be selectively retained. The different schemes may relate to measuring a relevancy of the identified data for predicting behavior of a system.

15 Claims, 2 Drawing Sheets

(51) Int. Cl.
*G06F 16/35* (2019.01)
*G06Q 10/00* (2012.01)
*G06F 17/18* (2006.01)
*G06N 5/04* (2006.01)
*G09B 7/02* (2006.01)

(52) U.S. Cl.
CPC ............. *G06F 17/18* (2013.01); *G06N 5/04* (2013.01); *G06Q 10/00* (2013.01); *G09B 7/02* (2013.01)

(58) Field of Classification Search
CPC .. G06F 16/162; G06F 3/0652; G06F 16/3331; G06F 16/35; G06F 16/22; G06F 17/18; G06N 5/04; G06Q 10/00; G09B 7/02
See application file for complete search history.

(56) References Cited

U.S. PATENT DOCUMENTS

| | | | |
|---|---|---|---|
| 2002/0065841 A1* | 5/2002 | Matsuda | G11B 20/10 |
| 2003/0014603 A1 | 1/2003 | Sasaki et al. | |
| 2004/0243624 A1 | 12/2004 | Marwah | |
| 2007/0083575 A1* | 4/2007 | Leung | G06F 16/122 |
| 2008/0161885 A1* | 7/2008 | Hsu | G06F 3/061 |
| | | | 607/60 |
| 2008/0222225 A1 | 9/2008 | Chron et al. | |
| 2010/0138383 A1 | 6/2010 | Winters et al. | |
| 2013/0111161 A1 | 5/2013 | Kotzur et al. | |
| 2013/0117272 A1* | 5/2013 | Barga | G06F 16/2477 |
| | | | 707/741 |
| 2014/0279854 A1 | 9/2014 | Scanlon et al. | |
| 2015/0142801 A1* | 5/2015 | Joseph | G06F 16/162 |
| | | | 707/737 |
| 2015/0220528 A1* | 8/2015 | Huang | G06F 16/185 |
| | | | 707/728 |
| 2015/0227544 A1* | 8/2015 | Goldberg | G06F 16/162 |
| | | | 707/692 |
| 2016/0063009 A1* | 3/2016 | Charania | G06F 16/162 |
| | | | 707/693 |

OTHER PUBLICATIONS

Unknown, Setting How Long Database Entries are Retained, IBM Security SiteProtector System 3.1.0, Retrieved from the Internet, Retrieved on Jun. 18, 2015, 3 pages.
Van De Merckt, et al., "Fast Automatic Classification in Extremely Large Data Sets: The RANK Approach", 2009, JMLR: Workshop and Conference Proceedings 1, 8 pages.
Informatica, "Data Archive", available online at <https://web.archive.org/web/20161104092816/https://www.informatica.com/products/data-security/data-archive.html#fbid=LfJFi63VPDH>, Nov. 4, 2016, 6 pages.

\* cited by examiner

RETAIN DATA ABOVE THRESHOLD

BACKGROUND

To better understand operations within an enterprise, such as a company, educational organization or government agency, the enterprise may collect information regarding various aspects of such operations. The enterprise may also collect information regarding business aspects of the enterprise, such as information regarding offerings (goods and/or services) provided by the enterprise. Such information may be stored in a database and analyzed for use in system development, debugging and/or understanding the behavior of a system.

BRIEF DESCRIPTION OF THE DRAWINGS

The following detailed description references the drawings, wherein.

DETAILED DESCRIPTION

Figure 1:
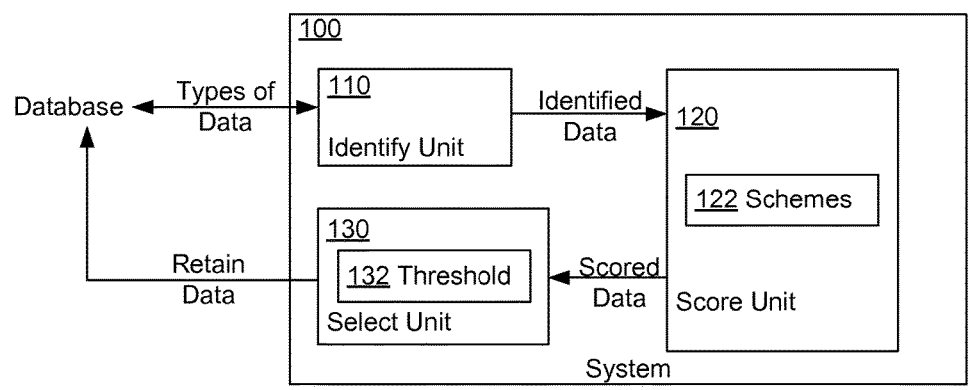
FIG. 1 is an example block diagram of a system to score different types of data are according to different schemes.

Specific details are given in the following description to provide a thorough understanding of embodiments. However, it will be understood that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

Big data analytics systems may store data from different data sources, including metrics, events and logs. Data storage approaches in analytics systems may include analytics databases, file systems, and other type so structure. Long-term data availability may require increasing amounts of disk resources and higher database licensing costs. For example, simple analytics systems are using an analytic columnar database for storing and analyzing business metrics, events, and log files. Data that was not considered useful for business is now being loaded into an analytic database. Databases for such systems require large amounts of disk resources. In addition, the analytic database vendors' licensing model is based on a size of the raw data at the analytic database of the vendor.

Thus, data may be typically saved online for a predefined period of time and then purged when this period expires. However, the purged data may contain key insights into business and Information Technology (IT) infrastructure performance. When this data is purged, the ability to perform analytics on this data is lost. Hence, businesses are faced with the dilemma of balancing saving storage costs with retaining data that may help them reduce or solve performance issues that impact the business and customers. For instance, such purged data may be event, metric, or log information that could have provided enhanced analytic and predictive information abilities to better prevent downtime, outages, and other IT system issues that can significantly impact the business. Thus, a system that could identify that key data and mark it for exception from purging, could lead to improved IT monitoring, data analysis, predictive abilities, and ultimately more stable service provision.

Examples may provide smart data retention based on automatic self-learning algorithms that examine user behavior and anomalous data behavior. For instance, an example system may include an identify unit, a score unit and a select unit. The identify unit may identify different types of data stored at a database. The score unit may score the identified data, where different types of data are scored according to different schemes. The select unit may selectively retain the scored data that is above a threshold. The different schemes may relate to measuring a relevancy of the identified data for predicting behavior of the system.

According to examples, businesses may need to decide between longer data retention periods, which results in increased costs, or less available historical analytic data available to big data analytics tools for analysis and prediction, which results in decreased ability to predict and prevent system downtime or performance issues that impact customers. Further, by only keeping key, business critical, data in the database longer, examples may enhance the capability and accuracy of big data analytics tools while improving or optimizing overall costs of long-term data retention, since only the data that improves monitoring and predictive analytics is stored.

For instance, examples may rank each piece of data and then decide which data is most important to be kept. Examples may identify three types of data, each of which may be ranked with a different method. The data types may be metric, events, and logs. Once all the data types are ranked, examples may determine which subset of ranked data should actually be retained, based on a ranking level threshold, which may be user configured.

Referring now to the drawings, FIG. 1 is an example block diagram of a system 100 to score different types of data according to different schemes. The system 100 may be any type of network and/or any element of the network, such as a computing device, a controller, a server, a network appliance, a thin client, a zero client, a terminal, a network switch, a hub, a router, a gateway, an access point and the like.

The system 100 is shown include an identify unit 110, a score unit 120 a select unit 130. The identify, score and select units 110, 120 and 130, may include, for example, a hardware device including electronic circuitry for implementing the functionality described below, such as control logic and/or memory. In addition or as an alternative, the identify, score and select units 110, 120 and 130, may be implemented as a series of instructions encoded on a machine-readable storage medium and executable by a processor.

The identify unit 110 may identify different types of data stored at a database. The score unit 120 may score the identified data, where different types of data are scored according to different schemes 122. The select unit 130 may selectively retain the scored data that is above a threshold 132. The different schemes 122 relate to measuring a relevancy of the identified data for predicting behavior of the system 100. The system 100 may be explained in greater detail below with respect to FIG. 2.

Figure 2:
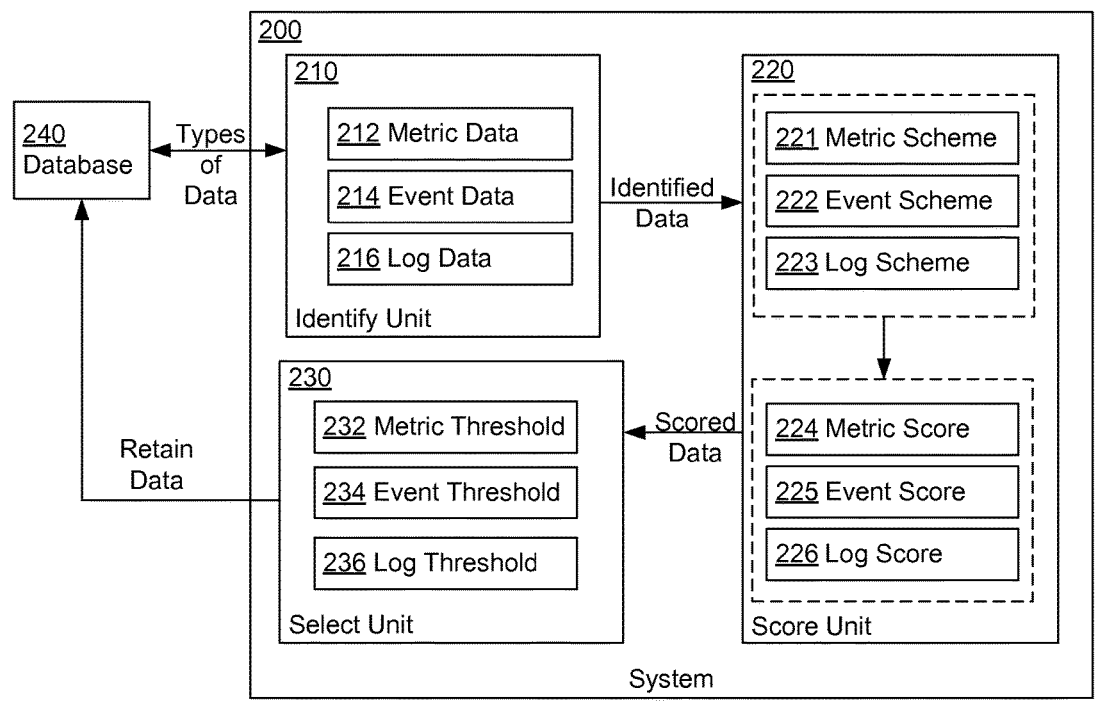
FIG. 2 is another example block diagram of a system to score different types of data according to different schemes.

FIG. 2 is another example block diagram of a system 200 to score different types of data according to different schemes. The system 200 may be any type of network and/or any element of the network such as a computing device, a controller, a server, a network appliance, a thin client, a zero client, a terminal, a network switch, a hub, a router, a gateway, an access point and the like.

The system 200 of FIG. 2 may at least respectively include the functionality and/or hardware of the system 100 of FIG. 1. For example, the system 200 of FIG. 2 includes an identify unit 210, a score unit 220 and a select unit 230. Further, the identify, score and select units 210, 220 and 230 of the system 200 of FIG. 2 may respectively include the functionality and/or hardware of the identify, score and select units 110, 120 and 130 of the system 100 of FIG. 1.

The identify unit 210 may identify different types of data stored at a database, such as metric, event and/or log data 212, 214 and 215. The score unit 220 may score the identified data, where different types of data are scored according to different schemes, such as metric, event and/or logs schemes 221-223. The different schemes may relate to measuring a relevancy of the identified data for predicting behavior of the system 200. The select unit 230 may selectively retain the scored data that is above a threshold, such as one of metric, event and log thresholds 232, 234 and 236. Further, the select unit 230 may purge or discard the scored data that is equal to or below its corresponding threshold. The various thresholds may be determined experimentally, according to user preference and/or properties of the data, such as aggregate values for the scored data.

The metric data 212 may relate to a measured parameter. The event data 214 relates to delivery assurance of an information technology (IT) service. The log data 216 relates to systematically generated messages by a component of the system 200. In one example, the different type of data may include the metric data 212. Here, the score unit 220 may use the metric scheme 221. For instance, the score unit 220 may divide the metric data 212 into buckets of data. Each of the buckets may define a different time interval. Then, the score unit 220 may compute a statistical measure (CSM) for each of the buckets. Examples of the CSM may include a median, average, standard deviation, probability distribution and the like.

The score unit 220 may use the CSM to compute a metric score 224 for each of the buckets of metric data 212. Next, the select unit 230 may compare the metric scores 224 to the metric threshold 232 to determine which of the metric data 212 to retain. For example, only metric data 212 having the metric score 224 above the metric threshold 232 may be flagged for retention. The select unit 230 may also determine the metric threshold 232 may be based on an aggregate value of the metric scores 224 of each of the buckets, such as to determine a baseline.

The metric data 212 may include a plurality of parameters. Parameters may relate to information that a user or administrator is be interested in monitoring, such as to identify trends, problems, etc. These parameters may be any of a variety of different types of information. For example, the parameters may include information about financial transactions such as balance, transaction amount, volume, etc.

In one example, the score unit 220 may use the metric scheme 221 to choose at least two of the plurality of parameters based on user activity. Then, the score unit 220 may convert the chosen parameters to numeric-based metrics. Lastly, the score unit 220 may estimate the metric score 224 related to a similarity between the chosen parameters based on the numeric-based metrics. The select unit 230 may compare the metric score 224 to the metric threshold 232 to determine if the metric data related to the chosen parameters is to be retained.

The score unit 220 may further analyze the metric data 212 to determine templates for the metric data 212. The score unit 220 may then organize the plurality of metric data 212 into a plurality of clusters based on the determined templates. Afterward, the score unit 220 may generate a classification, based on an atom, which identifies a cluster or set of metric data elements, such as items of a log. Next, the score unit 220 may choose at least two of the plurality of parameters by searching for a parameter in the plurality of clusters that is at least one of synonymous to a parameter specified by a user to monitor and a similar neighboring symbol to a neighboring symbol of the parameter specified by the user to monitor.

In another example, the different type of data may include the event data 214. Each of the event data 214 may be associated with a degradation of a configuration item (not shown). The configuration item may be a hardware, software and/or logical component of the system 200. The degradation may relate to a failure to meet a service level.

The score unit 220 may use the event scheme 222 for the event data 214. Here, the score unit 220 may access configuration item past-preference pairings, with each pairing including a count of operator-exhibited preferences for event data 214 associated with a first configuration item relative to event data 214 associated with a second configuration item.

The count of preferences may be a count of occurrences that a user takes a corrective action relative to the event data 214 associated with the first configuration item ahead of taking the corrective action relative to event data 214 associated with the second configuration item. Further, the score unit 220 may create a prioritized ordering of the event data 214 utilizing the past-preference pairings. For example, a pairwise prioritization algorithm may be used to create the prioritized ordering.

The select unit 230 may compare at least one of the count of operator-exhibited preferences and the prioritized ordering of the event data 214 to the event threshold 234 to determine if the associated event data 214 is to be retained. For example, the select unit 230 may retain the event data 214 having the count of operator-exhibited preferences of greater than event threshold 234 and/or the event data 214 having a higher priority than that of the event threshold 234.

In yet another example, the different type of data may include the log data 216. The identify unit 210 and/or score unit 220 may use the log scheme 223 for the log data 216. Here, the identify unit 210 may identify a first set of event log elements from a plurality of components (not shown) of the system 200. Further, the identify unit 210 may identify a second set of event log elements from a target component (not shown) of the system 200. The target component may be, for example, a personal computer, a server, a digital printer, a database, etc.

The score unit 220 may compare the first set of event log elements and the second set of event log elements to determine a log score based on a configuration difference between the target component and the plurality of components. For example, error analysis may be initiated at a target computer because that computer of the system of computers is malfunctioning in some manner. Comparison of the log data between the target computer and the system of computers may help to troubleshoot and remedy issues that might be present. Alternatively or in addition, the select unit 230 may score the log data 216 based on a key word identified in the log data 216, such as fatal, error, exception and the like.

The log data 216 may be compiled through clustering into log data templates before the score unit 220 is to compare each set of log data elements assigned to a log data cluster according to a log data template of similarity between a respective text of the log data element and a template text of the log data cluster.

The log data templates may be used to identify groups of related data, for example, where each group may relate to one kind of system or application software (or a respective component thereof), process or failure. The result may be a conversion of log data elements from semi-structured text to a form which can be machine-read and be used in various systems analysis, problem solving, and other computer system related tasks. The log data template may be a string of similar text where some variable or variables are constant and in common between log data elements in the log data template. A log data element within the template, a specific word or character or string, may relate to some cluster in the log data template.

In one example, similarity may be determined by taking word ordering into account. An order-sensitive cosine similarity function or any other similar function, for instance, may be applied to provide a measure of similarity (i.e., a 'distance') of two log data elements. The select unit 230 may compare the log threshold 236 to the log score 226 to determine which of the log data 216 to retain. For example, only log data 216 having the log score 226 above the log threshold 236 may be flagged for retention. The select unit 230 may wait to select which data to retain until all of the data is scored by the score unit. For instance, the select unit 230 may dynamically adjust any of the metric, event and log thresholds 232, 234 and 236 based on amount of the data that is scored and/or an amount of storage space at the database 240.

Figure 3:
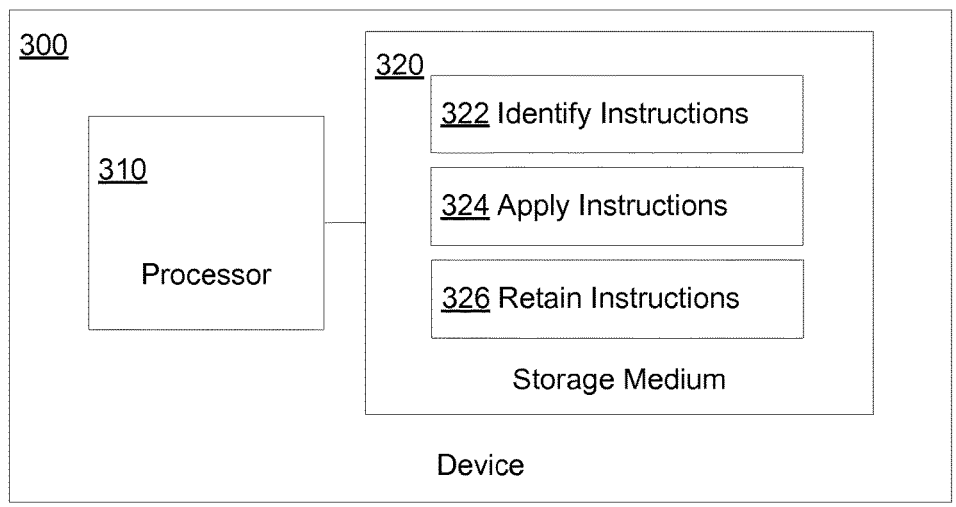
FIG. 3 is an example block diagram of a computing device including instructions for retaining data having a score that is above a threshold.

FIG. 3 is an example block diagram of a computing device 300 including instructions for retaining data having a score that is above a threshold. In the embodiment of FIG. 3, the computing device 300 includes a processor 310 and a machine-readable storage medium 320. The machine-readable storage medium 320 further includes instructions 322, 324 and 326 for performing NAC.

The computing device 300 may be or part of, for example, a computing device, a controller, a server, a network appliance, a thin client, a network switch, a hub, a router, a gateway, an access point, a network element, or any other type of device capable of executing the instructions 322, 324 and 326. In certain examples, the computing device 300 may include or be connected to additional components such as memories, sensors, displays, etc.

The processor 310 may be, at least one central processing unit (CPU), at least one semiconductor-based microprocessor, at least one graphics processing unit (GPU), other hardware devices suitable for retrieval and execution of instructions stored in the machine-readable storage medium 320, or combinations thereof. The processor 310 may fetch, decode, and execute instructions 322, 324 and 326 for retaining data having a score that is above a threshold. As an alternative or in addition to retrieving and executing instructions, the processor 310 may include at least one integrated circuit (IC), other control logic, other electronic circuits, or combinations thereof that include a number of electronic components for performing the functionality of instructions 322, 324 and 326.

The machine-readable storage medium 320 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for retaining data having a score that is above a threshold.

Figure 4:
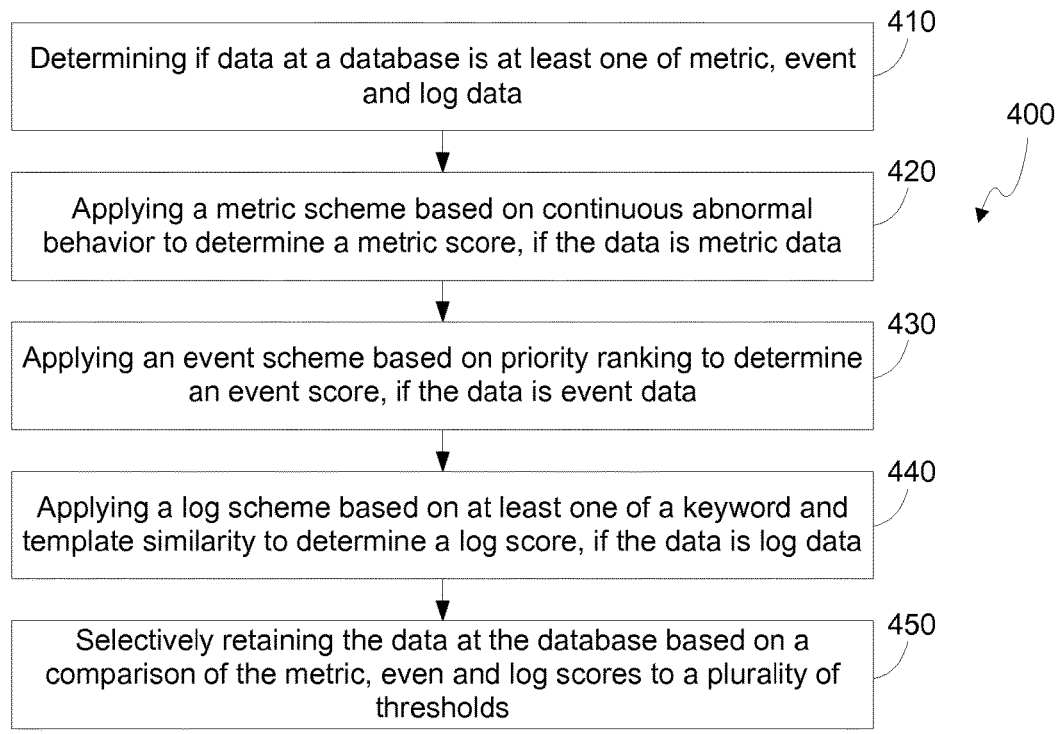
FIG. 4 is an example flowchart of a method for selectively retaining data at a database.

Moreover, the instructions 322, 324 and 326 when executed by a processor (e.g., via one processing element or multiple processing elements of the processor) can cause the processor to perform processes, such as, the process of FIG. 4. For example, the identify instructions 322 may be executed by the processor 310 to identify a type of data stored at a database (not shown).

The apply instructions 324 may be executed by the processor 310 to apply a type of scheme to the data based on the type of data. The types of data may include metric, event and/or log data. The metric data may relate to a measured parameter of the system. The event data may relate to delivery assurance of an IT service. The log data may relate to systematically generated messages by a component of the system.

The different types of schemes may calculate a score for each of the types of data. The score may indicate a relevancy of the identified data for predicting behavior of a system (not shown). The retain instructions 326 may be executed by the processor 310 to retain the data having the score that is above a threshold. The threshold may be user defined. The data that is below the threshold may be purged from the database.

FIG. 4 is an example flowchart of a method 400 for selectively retaining data at a database. Although execution of the method 400 is described below with reference to the system 200, other suitable components for execution of the method 400 can be utilized, such as the system 100. Additionally, the components for executing the method 400 may be spread among multiple system and/or devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 410, the system 200 determines if data at a database 240 is at least one of metric, event and log data 212, 214 and 216. At block 420, the system 200 applies a metric scheme 221 based on continuous abnormal behavior to determine a metric score 224, if the data is metric data 212. At block 430, the system 200 applies an event scheme 222 based on priority ranking to determine an event score 225, if the data is event data 214.

At block 440, the system 200 applies a log scheme 223 based on at least one of a keyword and template similarity to determine a log score 226, if the data is log data 216. Then, at block 450, the system 200 selectively retains the data at the database 240 based on a comparison of at least one of the metric, event and log scores 224-226 to at least one of a plurality of thresholds. The plurality of thresholds may include a metric threshold 232, an event threshold 234 and/or a log threshold 236. The metric threshold 232 may be compared to the metric score 224. The event threshold 234 may be compared to the event score 225. The log threshold 236 may be compared to the log score 226.

We claim:

1. A system, comprising:
a processor;

a non-transitory computer-readable storage medium including executable instructions that, when executed by the processor, cause the processor to operate as:
an identify unit to identify different types of data stored at a database, the different types of data comprising metric data, event data, and log data;
a score unit to score the identified data, wherein the metric data, event data, and log data are scored according to different schemes which relate to measuring a relevancy of the identified data for predicting behavior of the system; and
a select unit to selectively retain the scored data that is above a threshold.

2. The system of claim 1, wherein,
the metric data relates to a measured parameter,
the event data relates to delivery assurance of an information technology (IT) service, and
the log data relates to systematically generated messages by a component of the system.

3. The system of claim 2, wherein, when the identified data comprises the metric data, the executable instructions, when executed by the processor, cause the processor to operate as:
the score unit to use a metric scheme to,
divide the metric data into buckets, each of the buckets defining a different time interval,
compute a statistical measure (CSM) for each of the buckets, and
use the CSM to compute a metric score for each of the buckets of metric data, and
the select unit to compare a metric threshold to the metric scores of the buckets to determine which of the metric data to retain.

4. The system of claim 3, wherein the executable instructions, when executed by the processor, cause the processor to operate as:
the select unit to determine the metric threshold based on an aggregate value of the metric scores of each of the buckets, and
the CSM is at least one of a Median, average, standard deviation, and probability distribution.

5. The system of claim 2, wherein, when the identified data comprises the metric data, and the metric data comprises a plurality of parameters, the executable instructions, when executed by the processor, cause the processor to operate as:
the score unit to use a metric scheme to,
choose at least two of the plurality of parameters based on user activity,
convert the chosen parameters to numeric-based metrics, and
estimate a metric score related to a similarity between the chosen parameters based on the numeric-based metrics, and
the select unit to compare the metric score to the threshold to determine if the metric data related to the chosen parameters is to be retained.

6. The system of claim 5, wherein the executable instructions, when executed by the processor, cause the processor to operate as the score unit to:
analyze the metric data to determine templates for the metric data,
organize the metric data into a plurality of clusters based on the determined templates,
generate a classification, based on an atom that identifies a cluster of metric data elements, and choose at least two of the plurality of parameters by searching for a parameter in the plurality of clusters that is at least one of synonymous to a parameter specified by a user to monitor and a similar neighboring symbol to a neighboring symbol of the parameter specified by the user to monitor.

7. The system of claim 2, wherein when the identified data comprises the event data, each of the event data to be associated with a degradation of a configuration item, the executable instructions, when executed by the processor, cause the processor to operate as:
the score unit to use an event scheme to,
access configuration item past-preference pairings, with each pairing including a count of operator-exhibited preferences for event data associated with a first configuration item relative to event data associated with a second configuration item, and
create a prioritized ordering of the event data utilizing the past-preference pairings, and
the select unit to compare at least one of the count of operator-exhibited preferences and prioritized ordering of the event data to an event threshold to determine if the associated event data is to be retained.

8. The system of claim 7, wherein,
the count of preferences is a count of occurrences that a user takes a corrective action relative to event data associated with the first configuration item ahead of taking the corrective action relative to event data associated with the second configuration item,
the degradation is a failure to meet a service level, and
the configuration item is at least one of a hardware, software and logical component.

9. The system of claim 2, wherein when the identified data comprises the log data, the executable instructions, when executed by the processor, cause the processor to operate as:
the select unit to score the log data based on a key word identified in the log data.

10. The system of claim 9, wherein when the identified data comprises the log data, the executable instructions, when executed by the processor, cause the processor to operate as:
the identify unit to,
identify a first set of event log elements from a plurality of components of the system, and
identify a second set of event log elements from a target component of the system,
the score unit to compare the first set of event log elements and the second set of event log elements to determine a log score based on a configuration difference between the target component and the plurality of components, and
the select unit to compare a log threshold to the log score to determine which of the log data to retain.

11. The system of claim 10, wherein the log data is compiled through clustering into log data templates, wherein the executable instructions, when executed by the processor, cause the processor to operate as:
the score unit to compare each set of log data elements assigned to a log data cluster according to a log data template of similarity between a respective text of the log data element and a template text of the log data cluster.

12. A method, comprising:
determining a type of data from different types of data at a database, the different types of data comprising metric, event and log data;

applying a metric scheme based on continuous abnormal behavior to determine a metric score, when the determined type of data is metric data;

applying an event scheme based on priority ranking to determine an event score, when the determined type of data is event data;

applying a log scheme based on at least one of a keyword and template similarity to determine a log score, when the determined type of data is log data; and selectively retaining the data at the database based on a comparison of each of the metric, event and log scores to a respective one of a plurality of thresholds.

13. The method of claim 12, wherein, the plurality of thresholds includes a metric threshold, an event threshold and a log threshold, the method comprising:

comparing the metric threshold to the metric score;
comparing the event threshold to the event score; and
comparing the log threshold to the log score.

14. A non-transitory computer-readable storage medium storing instructions that, when executed by a processor, cause the processor to:

identify a type of data stored at a database;

apply a type of scheme to the data based on the type of data, the different types of schemes to calculate a score for each of the types of data, the score to indicate a relevancy of the identified data for predicting behavior of a system; and retain the data having the score that is above a threshold, wherein, the type of data comprises:

metric data related to a measured parameter, event data related to delivery assurance of an information technology (IT) service, and log data related to systematically generated messages by a component of a system.

15. The non-transitory computer-readable storage medium cartridge of claim 14, wherein, the threshold is user defined, and the data that is below the threshold is purged.

* * * * *